United States Patent [19]

Olsson

[11] Patent Number: 4,899,871
[45] Date of Patent: Feb. 13, 1990

[54] STORING INSTALLATION, PRIMARILY FOR AN ENDLESS CONVEYOR BELT TRAVELLING HELICALLY IN A NUMBER OF TURNS LAID UPON ONE ANOTHER IN A PILE

[75] Inventor: Lennart Olsson, Nyhamnsläge, Sweden

[73] Assignee: Frigoscandia Contracting AB, Helsingborg, Sweden

[21] Appl. No.: 300,016

[22] PCT Filed: Jul. 20, 1987

[86] PCT No.: PCT/SE87/00340
§ 371 Date: Jan. 11, 1989
§ 102(e) Date: Jan. 11, 1989

[87] PCT Pub. No.: WO88/00566
PCT Pub. Date: Jan. 28, 1988

[30] Foreign Application Priority Data
Jul. 24, 1986 [SE] Sweden ................................ 8603202

[51] Int. Cl.$^4$ .............................................. B65G 13/02
[52] U.S. Cl. ...................................... 198/778; 198/833
[58] Field of Search ............... 198/778, 842, 841, 833, 198/328, 831, 852, 817, 851

[56] References Cited
U.S. PATENT DOCUMENTS

| | | | |
|---|---|---|---|
| 617,779 | 1/1899 | Seeberger | 198/328 X |
| 1,153,845 | 9/1915 | Henneuse | 198/842 X |
| 3,664,487 | 5/1972 | Ballenger | 198/778 |
| 3,682,295 | 8/1972 | Roinestad | 198/833 |
| 3,773,166 | 11/1973 | Nowacki | 198/841 X |
| 3,938,651 | 2/1976 | Alfred et al. | 198/778 |
| 4,036,352 | 7/1977 | White | 198/778 |
| 4,434,884 | 3/1984 | Kettle | 198/328 |
| 4,450,953 | 5/1984 | Le Cann et al. | 198/778 |
| 4,565,282 | 1/1986 | Olsson et al. | 198/778 |
| 4,603,776 | 8/1986 | Olsson | 198/778 |

FOREIGN PATENT DOCUMENTS 213607 10/1975 Japan ................................ 198/833

Primary Examiner—Robert J. Spar
Assistant Examiner—Cheryl L. Gastineau
Attorney, Agent, or Firm—Browdy and Neimark

[57] ABSTRACT

A storing installation comprises two endless chains supporting a load for the conveyance thereof along a conveyance path and travelling in opposition to said conveyance path in a return path having more tightly curved portions than said conveyance path, to formed closed chain paths, and a frame for supporting said chains via at least one series of rolling elements arranged between said frame and the respective chain. Each chain comprises links overlapping one another in such a manner that the chain and the frame form an essentially closed channel for the rolling elements throughout the tighter return path.

9 Claims, 5 Drawing Sheets

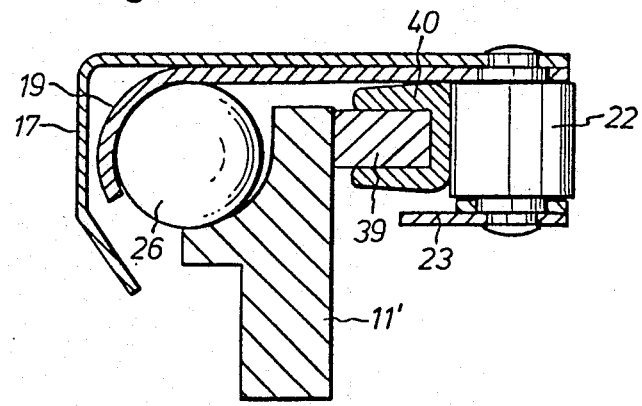
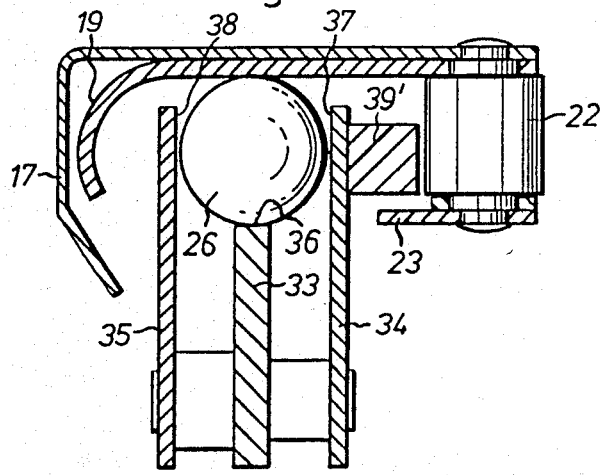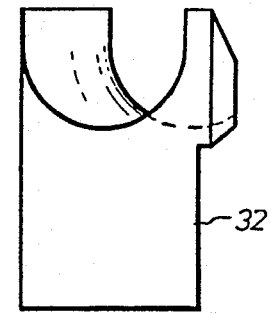

STORING INSTALLATION, PRIMARILY FOR AN ENDLESS CONVEYOR BELT TRAVELLING HELICALLY IN A NUMBER OF TURNS LAID UPON ONE ANOTHER IN A PILE

The present invention relates to a storing installation which comprises two endless chains supporting a load for the conveyance thereof along a conveyance path and travelling in opposition to said conveyance path in a return path having more tightly curved portions than said conveyance path, to form closed chain paths, and a frame for supporting said chains via at least one series of rolling elements arranged between said frame and the respective chain.

The storing installation is intended primarily for an endless conveyor belt travelling helically in a number of turns laid upon one another in a pile, the chains of said storing installation being arranged underneath the belt pile, supporting both edge portions of the lowermost belt turn, and travelling in opposition to the rise of the conveyor belt in the return path which is tighter than the conveyor belt path in the pile.

A conveyor belt of this type is shown in, for example, SE-C-7303179-1 and SE-C-8206759-6 in which, more particularly, the individual belt turns of the pile are supported, each by its underlying turn, by means of spacing members mounted at the belt edges.

Thus, SE-C-8206759-6 discloses a storing installation for a conveyor belt of the above-mentioned construction, said installation being of the type mentioned by way of introduction and comprising two chains which are arranged underneath the belt pile and support both belt edge portions throughout at least one complete turn, said chains being carried in a frame. This means that the chains will follow the lowermost belt turn in its rise and then travel in opposition to the conveyor belt rise in a return path which is tighter than the path of the conveyor belt, to form closed chain paths. Between each chain and the frame carrying the chain, there are arranged two series of balls to facilitate the chain movement. The series of balls do not follow the chain in its return path, but are conducted through separate channels to a point in the chain path immediately ahead of the location where the chain begins to support the conveyor belt.

In refrigerating plants, however, such a separate channel for the balls involves the risk that ice may form at the junctions with the chain path and thus obstruct the ball movement. Such obstacles are not readily removed by the pressure exerted by the balls.

The primary object of the present invention is to provide a storing installation of the type mentioned by way of introduction and adapted to eliminate the said risk of ice formation. A further object is to provide a storing installation in which the rolling elements are positively driven throughout the chain path, and also a storing installation which requires but one series of rolling elements for each chain. The said primary object is achieved in that each chain comprises links overlapping one another along the upper side and one edge side of the chain and hingedly interconnected at the other edge side of the chain along axes perpendicular to the longitudinal direction and the lateral direction of the chain, such that the chain and the frame form an essentially closed channel for the rolling elements also throughout the tighter return path where the links are swung out from one another about said axes.

The axes interconnecting the chain links thus are essentially parallel to the vertical direction of the pile. Furthermore, the adjoining links of at least one chain are preferably spaced apart a distance such that the chain is laterally flexible in both directions.

Instead of a second series of rolling elements, use may well be made of slide rails mounted on the frame for sliding contact with chain rails on each chain. In this instance, link rollers may be rotatably mounted about the link connecting pins for rolling contact with the respective slide rail. To drive at least one chain, and thus the conveyor belt, a motor may be provided at the beginning of the return path, said motor being coupled with a toothed wheel engaging with the link rollers of said chain.

More particularly, the link rollers are positioned between the links and the chain rails. The links consist of outer links and inner links arranged alternately with one another, said outer links encompassing said inner links. The edge portions of the inner links facing away from the link connecting pins preferably are bent with a radius of curvature essentially corresponding to the radius of balls which constitute the rolling elements. Furthermore, the corner portions of said inner link edge portions facing away from the link connecting pins may be bevelled to enhance the formation of an unbroken channel in the tightest portions of the return paths.

In the return path, the rolling elements may well be conducted along a path closer to the link pivot side. In this case, the frame can form, along the return path, the essentially closed rolling element channel in combination with only the horizontal overlying portions of the links which form the upper side of the chain. More particularly, the frame can form, for each chain, a rolling path as well as an inner and an outer guide surface for the rolling elements.

The present invention provides a rolling element channel which is completely covered from above. This means that, in a refrigerating plant, ice, snow and dirt cannot fall down into the rolling element channel, not even in the tightly curved portions, because the chains also at these locations form no gaps between the links. Furthermore, the chains provide a positive drive of the rolling elements throughout the length of the chain path, whereby stops and ice formation are prevented.

The invention will be described in more detail below, reference being had to the accompanying drawings.

FIGS. 6 and 7 are cross-sectional views at the lower and the upper part, respectively, of the chain shown in FIG. 5.

FIG. 8 is an end view of a ball guide shown in FIG. 5.

Figure 1:
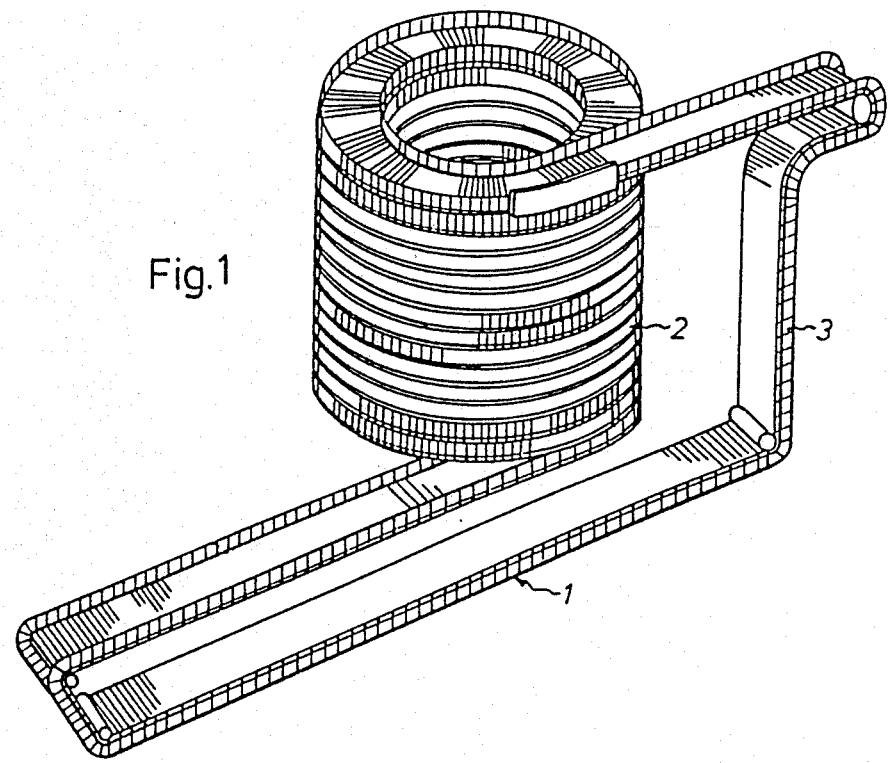
FIG. 1 is a perspective view of the conveyor belt of a conveying device, for which the storing installation according to the invention is intended.

The conveying device illustrated in FIG. 1 comprises a conveyor belt 1 which is arranged to follow, along a part of its length, a path comprising a number of turns extending helically above one another in a pile 2. The conveyor belt 1 is endless and travels from the upper end of the pile 2 in a path 3 outside the pile 2 to the lower end of said pile. However, the direction of rotation of the pile is optional, and the belt 1 may thus leave the pile 2 either at the upper end or at the lower end.

To be able to travel helically, as shown in FIG. 1, the belt 1 comprises in per se known manner a plurality of link means 4 (FIG. 3) which extend in the lateral direction of the belt 1 and are so displaceable horizontally relative to one another in the longitudinal direction of the belt that the belt 1 is laterally pivotable. The link means can also be pivoted vertically relative to one another about an axis parallel to the lateral direction, thereby enabling the belt 1 to follow the endless path which is shown in FIG. 1 and which comprises straight sections and curved sections along vertical and horizontal curves. To form the pile proper, each link means 4 consists of rod-shaped means 5 included in the bottom part of the belt 1 and provided at their ends with upstanding links 6. These links 6 which form the sides of the belt 1, are spacing members, the upper edge portions 7 of which are adapted to engage with the lower edge portions 8 of the spacing members 6 of the overlying turn, thereby to carry the belt 1 in superimposed turns.

Figure 2:
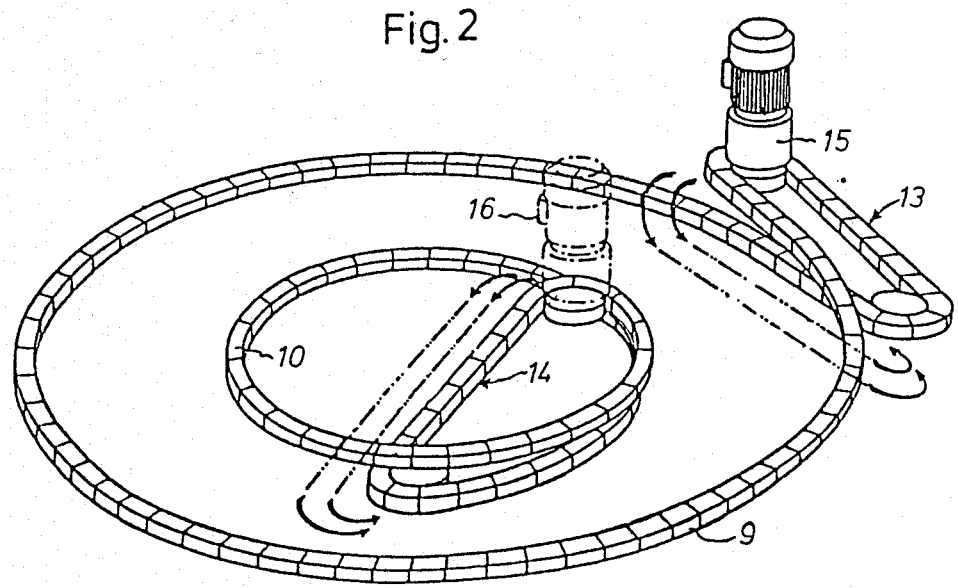
FIG. 2 is a perspective view illustrating the paths of movement of two chains comprised by the storing installation according to the invention.
Figure 3:
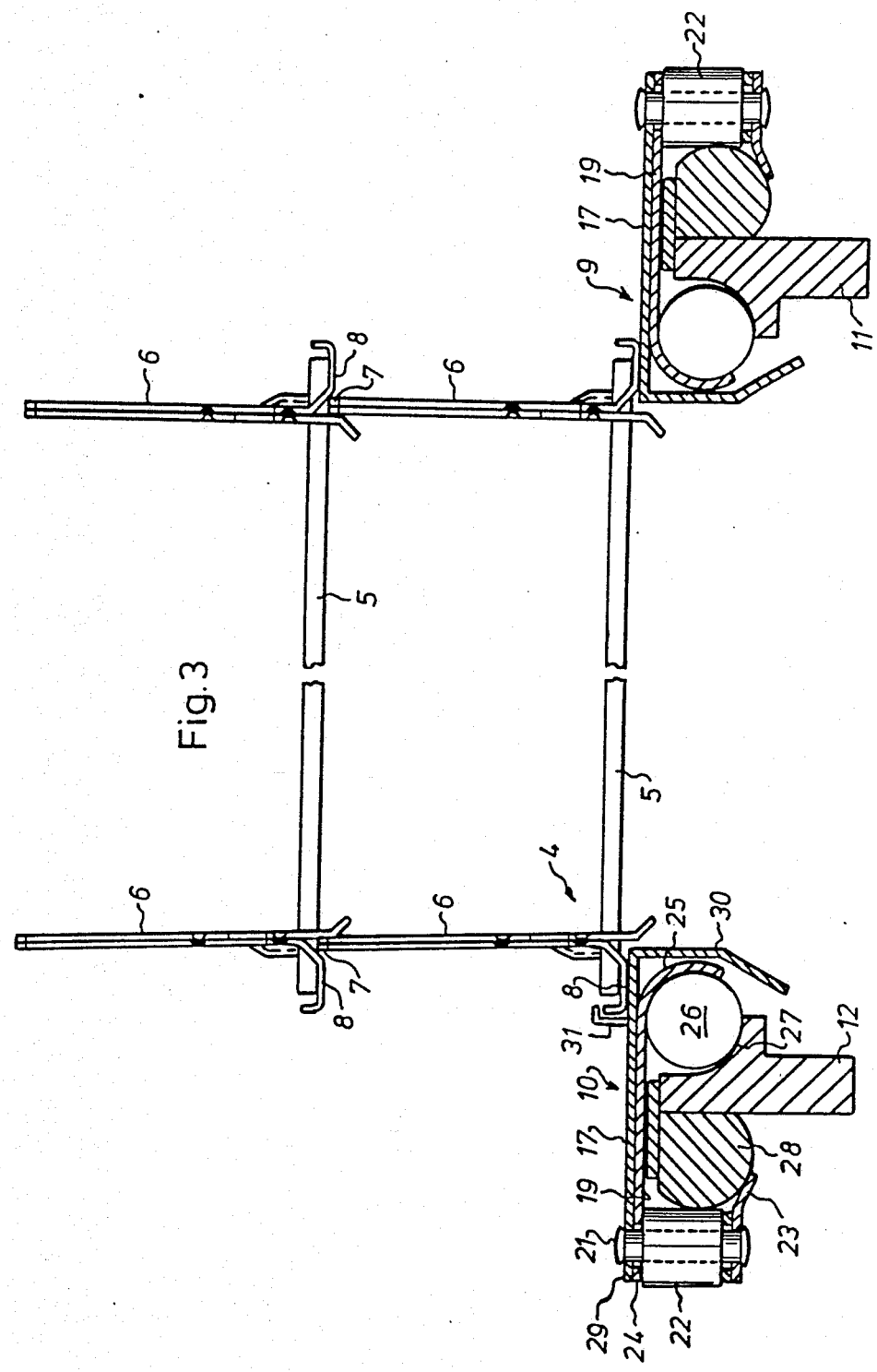
FIG. 3 illustrates, on an essentially larger scale, a cross-section of a first embodiment of the chains in FIG. 2, together with the carried belt.

The pile 2 of the superimposed helically extending turns of the endless conveyor belt is supported by a storing installation which, as shown in FIGS. 2 and 3, comprises two endless chains 9 and 10 arranged underneath the lowermost turn of the belt pile 2 and supporting the two side edge portions of the belt 1. The chains 9 and 10 themselves are carried by frames 11, 12. Each chain 9 and 10 is arranged to follow the belt 1 in its rise throughout at least one complete turn. After that the chains 9 and 10 travel in a direction opposite to the rise of the conveyor belt 1 in a return path 13 and 14, respectively, at the side of the belt pile 2 to form a closed chain path. The chain 9 follows the return path 13 which is tighter than the pile 2 and which is located outside the belt pile 2, while the chain 10 follows the return path 14 which lies within the belt pile 2 and also is tighter than the belt pile 2.

At the beginning of the return path 13, the chain 9 is driven by means of a motor 15 and in turn drives the supported conveyor belt 1. Also the chain 10 may be driven by means of a second motor 16.

FIG. 2 indicates by arrows and dash-dot lines the position of the separate channels of prior art technique for the return of balls provided underneath each chain 9, 10.

Figure 4:
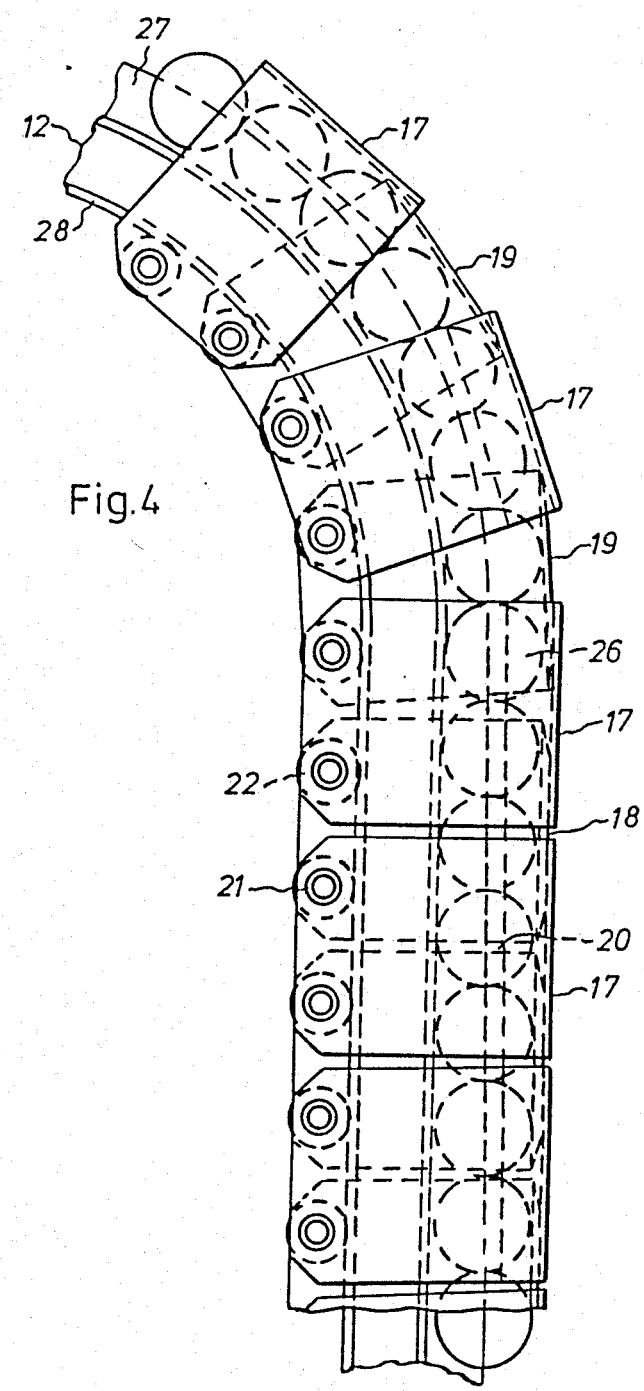
FIG. 4 is a schematic plan view of one of the chains shown in FIGS. 2 and 3.
Figure 5:
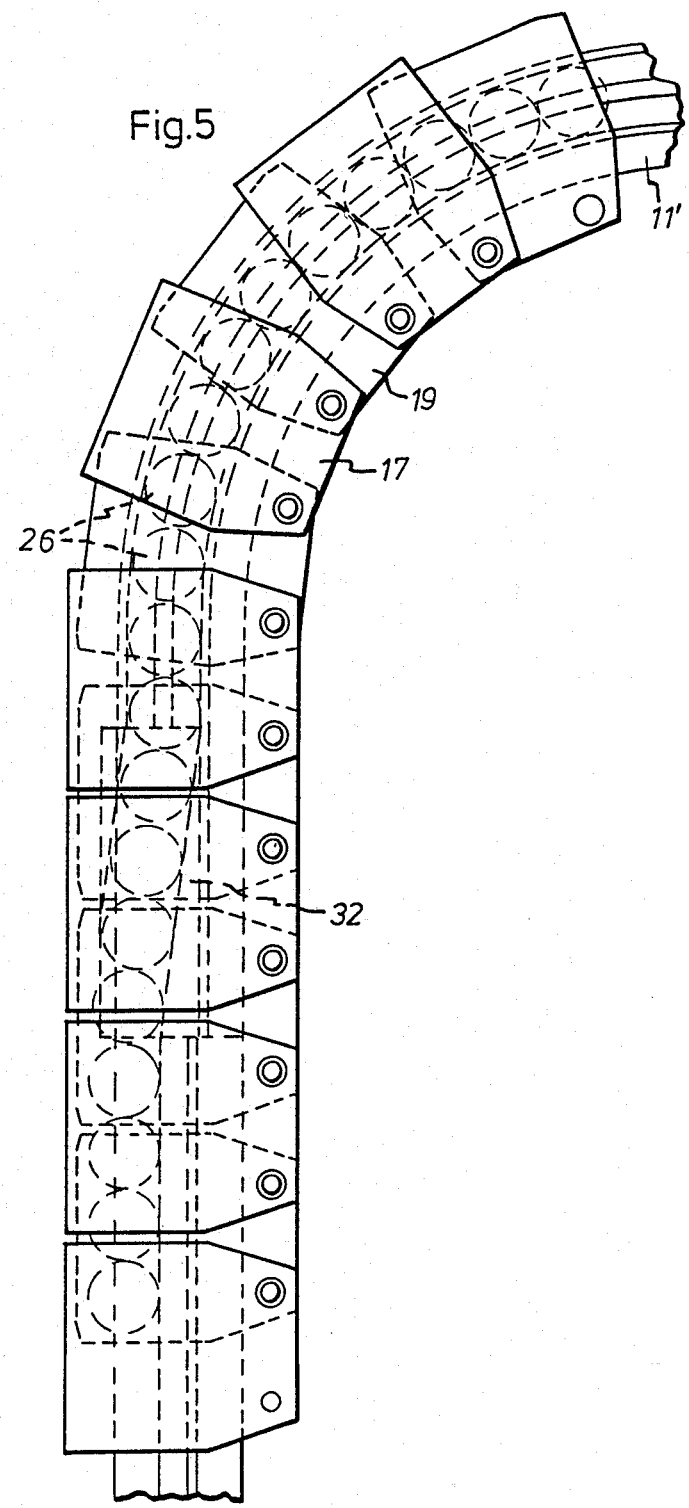
FIG. 5 is a plan view, corresponding to FIG. 4, of a second embodiment of a chain according to the invention.

As will appear from FIGS. 3 and 4, each chain 9, 10 comprises links 17 and 19 overlapping one another. More particularly, the chain comprises a series of outer links 17 spaced apart a small distance 18 and each overlapping two inner links 19 spaced apart approximately the same distance 20. Each outer link 17 is hingedly connected with the two inner links 19, which it overlaps, by means of pins 21 on which also a link roller 22 is rotatably mounted between the links 17, 19 and a lower chain rail 23 having essentially the same length as the inner link 19. Each inner link 19 extends horizontally from its side edge 24 provided with two pins 21, over the frame 12 and is downwardly bent at its opposite free edge portion 25 with a radius of curvature essentially corresponding to the radius of balls 26 serving as rolling elements between the frame 12 and the chain 10. The frame 12 has a rolling path 27 which is opposite to the downwardly bent side edge portion 25 of the inner link 19 and on which the balls 26 roll while transferring the load of the belt pile 2 to the frame 12.

Because the load of the belt pile 2 is transferred eccentrically in relation to the balls 26 to the frame 12, the chain links 17, 19 are subjected to a torque striving to tilt these links about the series of balls 26. This torque is absorbed by the chain rail 23 engaging with the lower side of a slide rail 28 mounted in the frame. Also the link rollers 26 engage with and also roll against the rail 28 which preferably consists of some low-friction plastic material. However, the said torque can be made very low, for which reason the contact pressure between the chain rail 23 and the slide rail 28 will be very low, or none at all. In this case, the load upon the chain is transferred substantially via the balls 26.

To drive the chain 9, 10, the link rollers 22 thereof are in engagement with a toothed wheel (not shown) fixedly connected with the shaft of the motor 14, 15.

Like the inner links 19, each outer link extends horizontally from its side edge 29 provided with two pins 21 across the two inner links 19 overlapped thereby and has a downwardly bent side edge portion 30 encompassing the downwardly bent portion 25 of the inner links 19.

It will be appreciated that, because of the gaps 18, 20 between both the outer links 17 and the inner links 19, the chain can be bent horizontally with the link rollers 22 located outside the links 17, 19, i.e. as shown for the chain 9 in FIG. 2. When the chain 9 is laterally bent in the opposite direction in its return path 13, the outer links 17 and the rolling path 27 form a closed channel for the balls 26 so that the these cannot fall out of the gaps between the inner links 19. This is clearly shown in FIG. 4.

Since the chain 10 is deflected in the same direction along the lowermost turn of the conveyor belt and in its return path 14, the links 17, 19 of the chain 10 need not have such gaps as the gaps 18 and 20 between the links 17, 19 of the chain 9.

To facilitate the formation of an unbroken channel in the tightest parts of the return paths 13, 14, the corner portions of the links 19 are bevelled at the free edge portion 25, whereby the gaps 20 between the inner links 19 can be made sufficiently small to enable the outer links 17 in the tightest parts of the return paths 13 and 14 to prevent the formation of free gaps between the inner links 19.

The above-described embodiment of a storing installation can be modified within the scope of the invention. Thus, the link rollers 22 need not be rotatably mounted, but can be in sliding contact with the slide rail 28. This means also that the function of the storing installation will be but insignificantly deteriorated if the link rollers 22 in the embodiment described should freeze fast and not be able to turn. It is also possible to replace the slide rail 28 by a second series of balls, in which case the chain rails 23 and the frame 11, 12 is designed to form a ball channel. The slide rail 28 and the link rollers 22 or the like may also change places.

Finally, the outer links 17 of the chain 10 may be provided with abutments 31 against which the inner side edge of the conveyor belt 1 is adapted to abut during piling. In other words, the abutments 31 determine the curved shape of the pile 2 which need not be circular, but may also be oval.

FIGS. 5–8 illustrate a second embodiment of the invention, in which the chain 9, 10 has the same form as in the embodiment according to FIGS. 3 and 4. In the second embodiment, however, the balls are conducted in the return path 13, 14 along a path closer to the pivot side of the links 17, 19. This is achieved by means of a ball guide 32 at the beginning and the end, respectively, of the return path 13, 14, and along a distance in the return path the ball guide moves the balls laterally relative to the links 17, 19 into and out of a frame 11' which extends along the remainder of said return path 13, 14 and comprises three rails 33, 34 and 35 laterally fixed to one another at spaced-apart intervals and forming a rolling path 36 for the balls 26 as well as an inner guide surface 37 and an outer guide surface 38 for said balls.

In the second embodiment, the slide rail 28 has been replaced by a side flange 39 for the frame 11' on which side flange 39 a U-section 40 of plastic is mounted. Along the return path 13, 14, the side flange 39 merges with a side flange 39' of smaller width, and the U-section 40 has been omitted.

In the embodiment of the frame illustrated in FIG. 7, which is in the form of three rails 33–35 with interjacent gaps, snow or dirt entering the rolling element channel, as well as ice formed therein, can easily fall out of the channel through the gaps between the rails 33–35.

It will be appreciated that the above-described modifications of the first embodiment of the storing installation are applicable also to the second embodiment of the storing installation.

I claim:

1. A storing installation which comprises two endless chains (9, 10) supporting a load for the conveyance thereof along a conveyance path and travelling in opposition to said conveyance path in a return path (13, 14) having more tightly curved portions than said conveyance path, to form closed chain paths, and a frame (11, 12) for supporting said chains via at least one series of rolling elements (26) arranged between said frame and the respective chain (9, 10), characterised in that each chain (9, 10) comprises links (17, 19) overlapping one another along the upper side and one edge side of the chain and hingedly interconnected at the other edge side of the chain along axes perpendicular to the longitudinal direction and the lateral direction of the chain, such that the chain (9, 10) and the frame (11, 12) form an essentially closed channel for the rolling elements (26) also throughout the tighter return path (13, 14) where the links are swung out from one another about said axes.

2. A storing installation as claimed in claim 1, characterised by slide rails (28) mounted on the frame (11, 12) for sliding contact with chain rails (23) on each of said chains (9, 10).

3. A storing installation as claimed in claim 2, characterised in that link rollers (22) are rotatably mounted about the link connecting means (21) for rolling contact with said slide rail (28).

4. A storing installation as claimed in claim 3, characterised in that said link rollers (22) are located between the links (17, 19) and the chain rail (23).

5. A storing installation as claimed in any one claim 2, characterised in that said links (17, 19) comprise outer links (17) and inner links (19) which are mounted alternately with one another and of which the outer links (17) encompass the inner links (19).

6. A storing installation as claimed in claim 5, characterised in that side edges (25) of said inner links facing away from said link connecting means (21) are bent with a radius of curvature essentially corresponding to the radius of balls (26) forming the rolling elements.

7. A storing installation as claimed in claim 1 characterised in that the links (17 and 19, respectively) comprised by at least one chain (9) and adjoining one another are arranged with gaps (18 and 20, respectively) therebetween so that the chain (9) is laterally flexible in both directions.

8. A storing installation as claimed in claim 1 characterised in that the rolling elements (26) in the return path (13, 14) are conducted along a path closer to the pivot side of the links (17, 19) and in rolling contact with but the overlying link portions.

9. A storing installation as claimed in claim 1 for an endless conveyor belt travelling helically in a number of turns laid upon one another in a pile, the chains of said storing installation being arranged underneath the belt pile, supporting both edge portions of the lowermost belt turn, and travelling in opposition to the rise of the conveyor belt in the return path which is tighter than the conveyor belt path in the pile.

* * * * *